United States Patent
Iyer et al.

(10) Patent No.: US 12,211,082 B2
(45) Date of Patent: Jan. 28, 2025

(54) SYSTEMS AND METHODS FOR PERSONALIZING RECOMMENDATIONS USING REAL-TIME SIGNALS OF A USER SESSION

(71) Applicant: Walmart Apollo, LLC, Bentonville, AR (US)

(72) Inventors: Rahul Radhakrishnan Iyer, Sunnyvale, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 440 days.

(21) Appl. No.: 17/588,111

(22) Filed: Jan. 28, 2022

(65) Prior Publication Data
US 2023/0245197 A1    Aug. 3, 2023

(51) Int. Cl.
*G06Q 30/00* (2023.01)
*G06N 7/01* (2023.01)
*G06Q 30/0601* (2023.01)

(52) U.S. Cl.
CPC ........... *G06Q 30/0631* (2013.01); *G06N 7/01* (2023.01)

(58) Field of Classification Search
CPC ............................ G06Q 30/0631; G06N 7/01
See application file for complete search history.

(56) References Cited

U.S. PATENT DOCUMENTS

| | | | |
|---|---|---|---|
| 11,138,631 B1 | 10/2021 | Perevodchikov et al. | |
| 2013/0024318 A1* | 1/2013 | Zhang | G06N 20/00 705/26.7 |
| 2019/0026816 A1* | 1/2019 | Zhou | G06Q 30/0272 |
| 2020/0081815 A1 | 3/2020 | Malhotra et al. | |
| 2020/0265472 A1 | 8/2020 | Ali et al. | |
| 2021/0034683 A1 | 2/2021 | Yer et al. | |

OTHER PUBLICATIONS

Zhou, Xin, et al. "Multi-facet user preference learning for fine-grained item recommendation." Neurocomputing 385 (2020): 258-268.*
Strobhar "Transform online shopping experiences with personalized recommendations" Amazon Web Services, Inc. 2019.

* cited by examiner

*Primary Examiner* — Kathleen Palavecino
(74) *Attorney, Agent, or Firm* — Morgan, Lewis & Bockius LLP; Manita Rawat

(57) ABSTRACT

A session-specific conversion determination system can include a computing device configured to receive real-time signals of an event occurring from a user device. The real-time signals include interaction parameters. The computing device is also configured to obtain a set of historical data based on the interaction parameters and a set of facets and generate a probability affinity for each facet of the set of facets by implementing a machine learning model using the interaction parameters and the set of historical data as features. The computing device is also configured to adjust a display of a set of recommended items based on the probability affinity for each facet of the set of facets and transmit the display of the set of recommended items to a user interface of the user device.

20 Claims, 6 Drawing Sheets

SYSTEMS AND METHODS FOR PERSONALIZING RECOMMENDATIONS USING REAL-TIME SIGNALS OF A USER SESSION

TECHNICAL FIELD

The disclosure relates generally to systems and methods for generating personalized recommendations based on real-time signals of a session and more particularly to determining a probability of affinity or conversion using real-time signals to guide recommendations of existing database entries.

BACKGROUND

Customers shop for a variety of different items on ecommerce platforms. For example, customers can research and buy specific, expensive items as well as perform routine grocery shopping using different websites on their computers or applications on their mobile devices. In various scenarios, new customers browse items on ecommerce platforms and are presented with generic recommendations because recommendations cannot be based on historical data as such data does not exist. Therefore, ecommerce platforms do not adapt to new customers quickly to personalize the recommendations presented on the user interface.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a session-specific conversion determination system and related methods. The session-specific conversion determination system can include a computing device that is configured to receive real-time signals of an event occurring from a user device. The real-time signals include interaction parameters. The computing device is also configured to obtain a set of historical data based on the interaction parameters and a set of facets and generate a probability affinity for each facet of the set of facets by implementing a machine learning model using the interaction parameters and the set of historical data as features. The computing device is also configured to adjust a display of a set of recommended items based on the probability affinity for each facet of the set of facets and transmit the display of the set of recommended items to a user interface of the user device.

In another aspect, the computing device is configured to determine a weighting for each feature of the interaction parameters and generate the probability affinity based on the determined weighting.

In another aspect, the weighting is determined by implementing a Light Gradient Boost Machine using the interaction parameters.

In another aspect, the computing device is configured to, in response to receiving the real-time signals of the event occurring from the user device and prior to obtaining the set of historical data, determine an interaction category based on the interaction parameters and compute an interaction score based on the interaction category. The computing device is also configured to, in response to the interaction score being above a threshold, designate the interaction parameters as features for the machine learning model.

In another aspect, the computing device is configured to, in response to the interaction category being known, obtain a positive interaction ratio stored in a database corresponding to the interaction category and compute the interaction score based on the obtained positive interaction ratio.

In another aspect, the computing device is configured to, in response to the interaction category being unknown, simulate a set of interactions to determine a positive interaction ratio and compute the interaction score based on the determined positive interaction ratio.

In another aspect, the computing device is configured to determine the threshold based on historical data.

In another aspect, the computing device is configured to store the interaction score corresponding to the interaction parameters and at least one of a positive and negative interaction indicator for subsequent interaction score computation of the interaction category.

In another aspect, the computing device is configured to transmit the probability affinity for each facet of the set of facets to a recommendation system. The recommendation system is configured to use the probability affinity for each facet of the set of facets as features to identify and transmit the set of recommended items to the user device.

In various embodiments of the present disclosure, a method of session-specific conversion determinations is provided. In some embodiments, the method can include receiving real-time signals of an event occurring from a user device. The real-time signals include interaction parameters. The method can also include obtaining a set of historical data based on the interaction parameters and a set of facets and generating a probability affinity for each facet of the set of facets by implementing a machine learning model using the interaction parameters and the set of historical data as features. The method can further include adjusting a display of a set of recommended items based on the probability affinity for each facet of the set of facets and transmitting the display of the set of recommended items to a user interface of the user device.

In various embodiments of the present disclosure, a non-transitory computer readable medium is provided. The non-transitory computer readable medium can have instructions stored thereon, wherein the instructions, when executed by at least one processor, cause a device to perform operations that include receiving real-time signals of an event occurring from a user device. The real-time signals include interaction parameters. The operations can also include obtaining a set of historical data based on the interaction parameters and a set of facets and generating a probability affinity for each facet of the set of facets by implementing a machine learning model using the interaction parameters and the set of historical data as features. The operations can further include adjusting a display of a set of recommended items based on the probability affinity for each facet of the set of facets and transmitting the display of the set of recommended items to a user interface of the user device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

Figure 1:
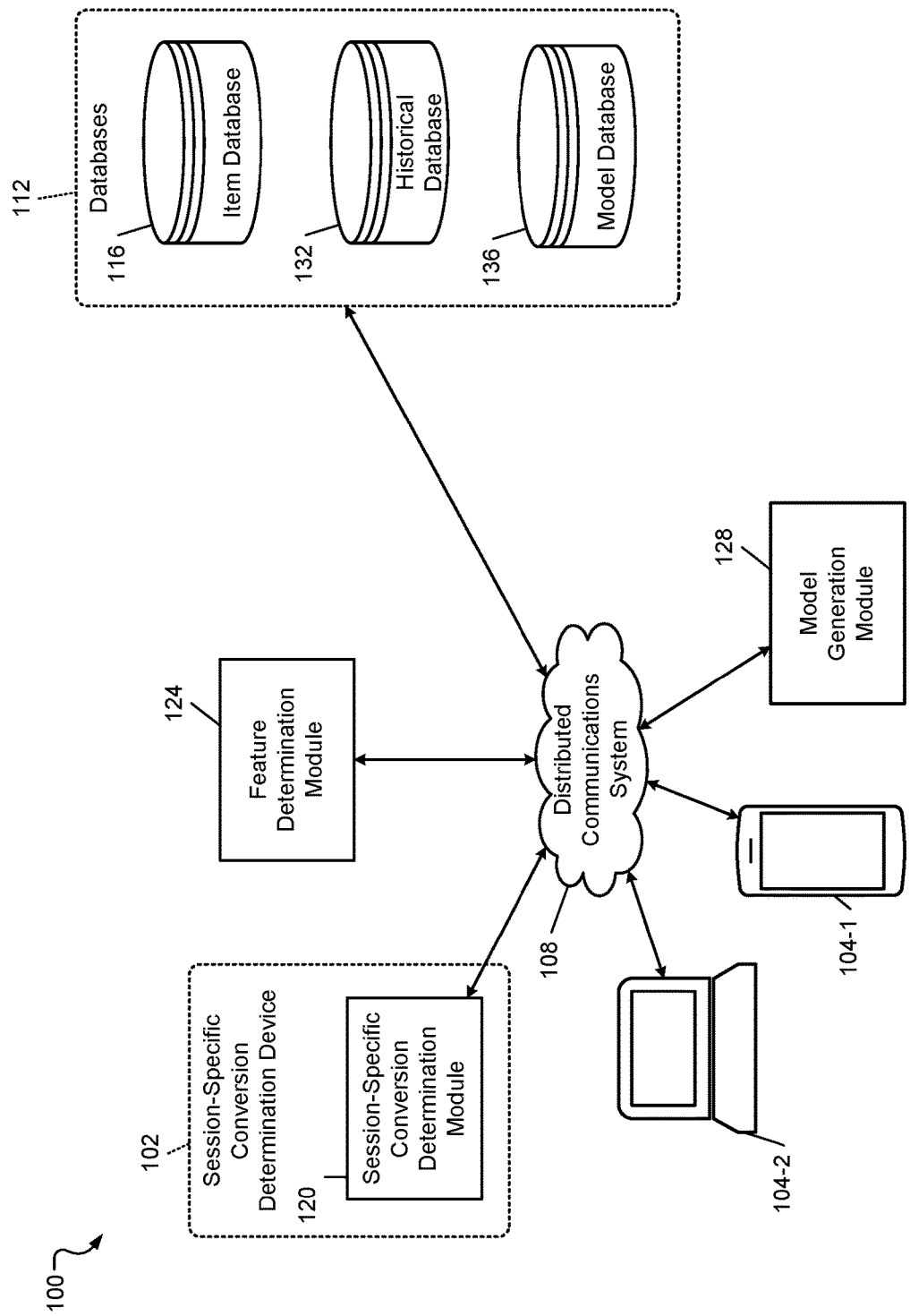
FIG. 1 is a block diagram of a session-specific conversion determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A session-specific conversion determination system may be implemented to analyze real-time signals for a shopping event (for example, a shopping session conducted by a user) to personalize the recommended items presented to a user on an ecommerce platform. That is, for any user browsing the ecommerce platform, with or without historical data, the session-specific conversion determination system receives real-time signals for each interaction the user has, via a user device, with the ecommerce platform. For example, real-time signals may include information characterizing features of when a user navigates to a particular, adds an item to their cart, etc. The real-time signals indicate the user, the origin page, selections made, resulting page, etc. The session-specific conversion determination system selects which interactions to use as features of a machine learning algorithm that models probability equations to determine a probability, given the session data or present interactions, of which facets of items matter most to the user. The facets, for example, may include a brand, a flavor, a price range, etc. that characterize each item on the ecommerce platform. Based on the determined probabilities indicating an affinity of the user towards each facet, the session-specific conversion determination system can personalize the recommended items displayed to the user, for example, by filtering items on a particular page, re-ordering items on a particular page, and/or transmitting the determined probabilities to another recommendation model that uses the probabilities as features in a machine learning model.

To identify which session data or interactions to use as features in the machine learning model of the session-specific conversion determination system, the session-specific conversion determination system generates, for each interaction, an interaction score based on a ratio of positive interactions for parameters of the particular interaction including interaction type (such as, whether the interaction is a view, an add-to-cart selection, a search, etc.), a page of the interaction (such as, a homepage, a search page, a category page, etc.), and a module of the interaction (such as, which particular section of the webpage the user is interacting with during the interaction). The session-specific conversion determination system determines whether the interaction corresponds to a particular interaction triplet based on the interaction type, the page of interaction, and the module of interaction, to identify whether the session-specific conversion determination system has stored data about the particular interaction indicting a number of positive interactions. For example, an interaction may be deemed positive if the interaction results in conversion or purchase of an item related to the interaction. If so, the session-specific conversion determination system uses the stored data regarding positive interactions. Otherwise, if the session-specific conversion determination system does not have any data or not enough data regarding positive interactions, the session-specific conversion determination system may simulate the positive interactions by, for example, generating a random dataset of positive and negative interactions.

Then, the session-specific conversion determination system selects the interactions with an interaction score above a particular confidence interval or threshold, for example, a 95% confidence interval, to use the interaction as a feature to determine user affinity towards particular facets. Therefore, if the session-specific conversion determination system determines that the interaction score is above a confidence interval generated using historical data, the interaction is used as a feature for machine learning models to determine user affinity and generate or adjust recommended items. That is, the confidence interval ensures that the interaction score of the interaction indicates a feature from which user affinity can be modelled. For example, if the interaction is new and the simulation is not very accurate, the interaction may not be a feature from which the session-specific conversion determination system should determine user affinity. Otherwise, the session-specific conversion determination system stores the interaction and interactions score as a previous interaction to learn from historical interactions and build a known positive interaction ratio from the feedback. Further, whether the interaction results in a positive or negative interaction is also stored to build a dataset corresponding to the particular interaction triplet or category.

While a user does not need to be logged in for the session-specific conversion determination system to identify features and model user affinity toward item facets, the session-specific conversion determination system can also determine user affinity while the user is logged into their account. For users that are logged in, the session-specific conversion determination system can store in-session determined affinities as well as use historical user data as features of the machine learning model to determine user affinity. Moreover, if a user is not logged in during a session and later logs into their account, the session-specific conversion determination system can link the session information to the user's identifier after the user has logged in. The session-specific conversion determination system is consistently updating the preference probabilities for each facet and adjusting items recommended to the user throughout the session based on real-time signals. In this way, the user has an improved user experience by having consistently improved recommendations, independent of whether the user in logged in.

Referring to FIG. 1, a block diagram of a session-specific conversion determination system 100 is shown. The session-specific conversion determination system 100 may include a session-specific conversion determination device 102 and user devices 104-1 and 104-2, collectively user device 104, such as a phone, tablet, laptop, mobile computing device, desktop, etc., capable of communicating, via a distributed communications system 108, with a plurality of databases 112 and modules. The user device 104 may display an ecommerce marketplace via a web browser or an application for customers to view items for sale by the ecommerce marketplace that are stored in an item database 116. For example, a customer may browse a webpage displayed on a graphical user interface of the user device 104, make a selection on the graphical user interface of the user device 104, and/or submit a query through the graphical user interface of the user device 104 on the ecommerce marketplace through a web browser or application, which retrieves a subset of items from the item database 116 that pertain to the query and displays the subset of items to the customer via the graphical user interface of the user device 104.

The session-specific conversion determination system 100 also includes a session-specific conversion determination module 120, a feature determination module 124, and a model generation module 128. The session-specific conversion determination module 120 receives features from the feature determination module 124 based on session interactions of the user on the user device 104. The received features are real-time signals of user interactions on the user device 104 that result in interaction scores above a confidence threshold, so the interaction is considered to have a high enough interaction score, indicating the interaction may be used as a feature in a machine learning model to determine user affinity. The model generation module 128 may train a machine learning model based on historical data over different time periods. The machine learning model may be updated daily to incorporate the newest data of user interactions. The machine learning model may be implemented as a supervised machine learning algorithm modelling a user's probability of preferring a particular facet based on the present session data. For example, the machine learning model may predict the user affinity towards or away from each of a plurality of predetermined facets, such as brand, flavor, price, etc. Prior to implementing the machine learning model, the session-specific conversion determination module 120 may determine weightings for each of the features input to the machine learning model using a state-of-the-art Light Gradient Boosting Machine. The session-specific conversion determination system 100 may also consider information including a user's location to determine user affinity based on user's in the area, which is incorporated into the machine learning model.

The session-specific conversion determination module 120, the feature determination module 124, and the model generation module 128 may use data stored in the plurality of databases 112, including data stored in the item database 116 (for example, storing the plurality of items for sale and corresponding price, brand, category, etc.), a historical database 132 (for example, including ratios between item views and add-to-carts that resulted in a purchase, resulted in no purchase, amount of time a user viewed an item, etc.), and a model database 136 (for example, for storing machine learning models). The session-specific conversion determination system 100 receives real-time signals as a user is browsing an ecommerce marketplace and, using interaction data, determines which facets the user has an affinity towards in order to generate recommended items based in part on the user's affinity and/or filter or re-ordered the already recommended items based on the user's affinity.

The session-specific conversion determination device 102 and the user device 104 can be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the session-specific conversion determination device 102 and/or the user device 104 can be a computer, a workstation, a laptop, a server such as a cloud-based server, or any other suitable device. In some examples, session-specific conversion determination device 102 and/or the user device 104 can be a cellular phone, a smart phone, a tablet, a personal assistant device, a voice assistant device, a digital assistant, a laptop, a computer, or any other suitable device. In various implementations, the session-specific conversion determination device 102 is on a central computing system that is operated and/or controlled by a retailer. Additionally or alternatively, the modules and databases of the session-specific conversion determination device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFix network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
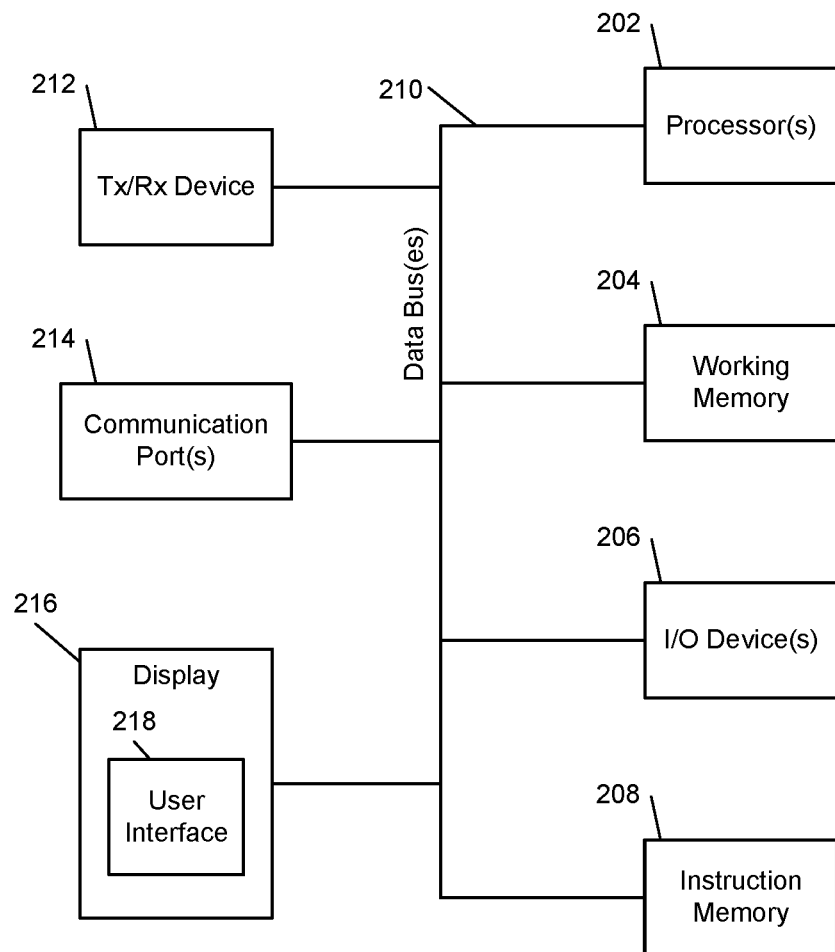
FIG. 2 is a block diagram of a computing device implementing the session-specific conversion determination device of FIG. 1 in accordance with some embodiments.

FIG. 2 illustrates an example computing device 200. The session-specific conversion determination device 102 and/or the user device 104 may include the features shown in FIG. 2. For the sake of brevity, FIG. 2 is described relative to the session-specific conversion determination device 102.

As shown, the session-specific conversion determination device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the session-specific conversion determination device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the session-specific conversion determination device 102. For example, user interface 218 can be a user interface that allows an operator to select and browse items via the ecommerce website or marketplace. The user interface 218 can, for example, display the items for sale for a user or customer view as a result of searching or browsing on an ecommerce marketplace. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the session-specific conversion determination device 102 will be operating. Processor(s) 202 is operable to receive data from, or send data to, a network, such as the distributed communications system 108 of FIG. 1, via transceiver 212.

Figure 3:
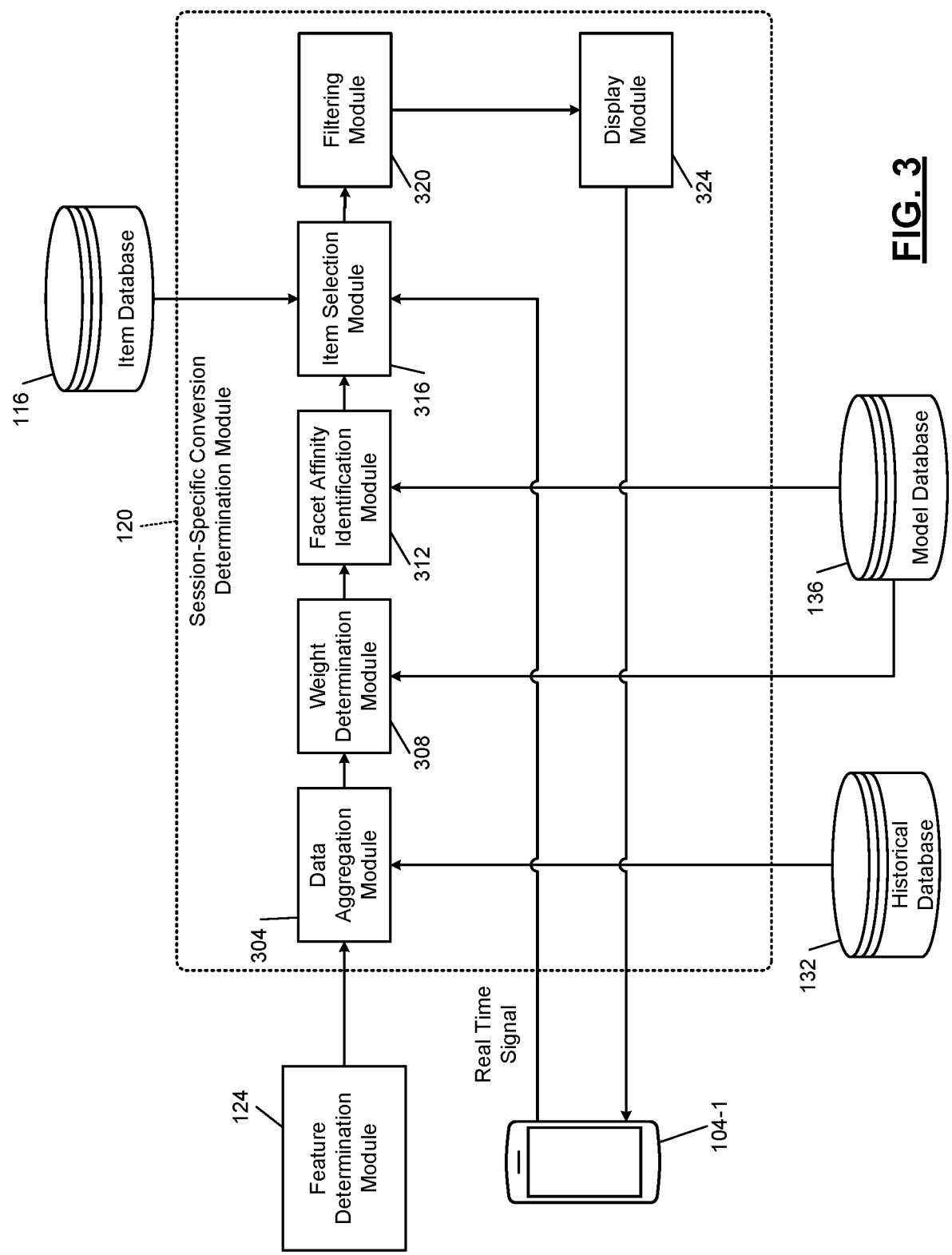
FIG. 3 is a block diagram illustrating an example session-specific conversion determination module of the session-specific conversion determination system of FIG. 1 in accordance with some embodiments.

Referring to FIG. 3, a block diagram illustrating an example session-specific conversion determination module 120 of the session-specific conversion determination system 100 is shown. The session-specific conversion determination module 120 receives features from the feature determination module 124 that have been determined to be above a particular confidence interval or threshold. These features are real-time signals including data characterizing an interaction of a user on an ecommerce platform using the user device 104. The session-specific conversion determination module 120 includes a data aggregation module 304 that receives the features. The data aggregation module obtains historical user data, if available for the user, as well as a set of facets historically corresponding to the features (that is, the facets corresponding to items of the interaction data) from the historical database 132. The obtained historical data and facets are forwarded to a weight determination module 308, which may implement a Light Gradient Boost Machine stored in the model database 136, to determine a weighting of the received feature or received features based on interaction data and/or historical data. The weighting, historical data, selected facets, and interaction data (features) are forwarded to a facet affinity identification module 312.

The facet affinity identification module 312 selects a machine learning model from the model database 136 and implements the machine learning model using the received features of the interaction along with historical data and weighting to determine which of the selected facets the user may have an affinity towards. In various implementations, the machine learning model implements a supervised machine learning algorithm modeled based on probabilities formulations to determine, for each facet, whether the user has an affinity toward the facet or not. For example, the machine learning model may be trained to estimate a probability of a user preferring a facet given a particular session based on the following formula:

$$P(f, u|s) = P(u|s) * P(f|u,s)$$

where u represents the user in consideration, f represents the facet considered in a category (such as brand, flavor, price, etc.), and s represents the session information including the various interaction features.

Therefore, the facet affinity identification module 312 determines P(u|s), the probability the user is presently preferring a particular facet based on historical data of prior user sessions indicating user preferences, including user preferences across difference facets as well as P(f|u,s), the probability of the present user preferring a particular facet in the present sessions, determined using a Boolean classifier. In various implementations, the prior user probability may incorporate geographical information, including prior users within a distance of a location of the user device 104. The user affinity is forwarded to an item selection model 316. In various implementations, the user affinity may be forwarded to a separate recommendation module that identifies a set of items to recommend to the user based on, among other things, the determined user affinity.

The item selection module 316 may select recommended items based on the features or present interaction data (received as real-time signals from the user device 104) from the item database 116. For example, if the interaction data resulting in the features is a search query (or the received real-time signals are a search query, whether or not the feature determination module 124 determined the interaction was above the confidence interval), the item selection module 316 selects items from the item database 116 that pertain to the query. The selected items are forwarded to a filtering module 320 that filters or re-orders the selected items based on the determined user affinity. For example, if the user affinity indicates the user has an affinity for lower prices, the filtering module 320 may prefer or change the ranking of lower priced items so the user views these items earlier in the search results. The filtered or re-ordered items are forwarded to a display module 324 and displayed on the user interface of the user device 104.

Figure 4:
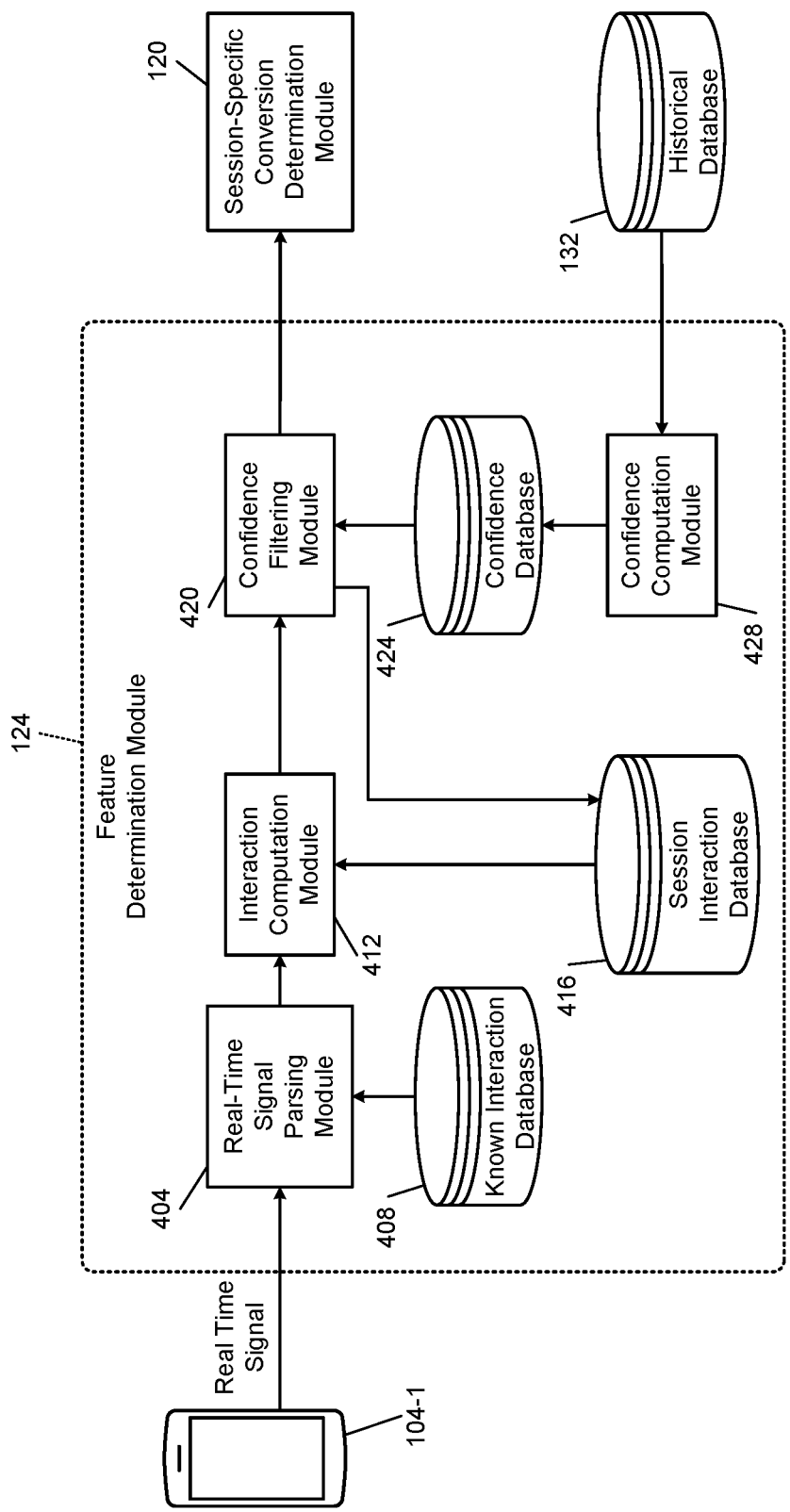
FIG. 4 is a block diagram illustrating an example feature determination module of the session-specific conversion determination system of FIG. 1 in accordance with some embodiments.

Referring to FIG. 4, a block diagram illustrating an example feature determination module 124 of the session-specific conversion determination system 100 is shown. The feature determination module 124 includes a real-time signal parsing module 404 that receives real-time signals of a user interacting on the user device 104. The real-time signal parsing module 404 identifies the interaction type, the interaction page, the interaction module, etc. indicating the parameters characterizing the interaction. The real-time signal parsing module 404 compares the interaction to a known interaction database 408 to identify whether the parameters of the interaction correspond to a known interaction, indicating a ratio of positive interactions for the particular interaction is stored.

If the interaction is known, the interaction and an indication the interaction is known is forwarded to an interaction computation module 412. Otherwise, the interaction is forwarded to the interaction computation module 412 and an indicator that the interaction is not known. The interaction computation module 412 computes an interaction score for the particular interaction based on the following formula:

$$F_{IPM}(k_1, k_2) = \frac{\alpha + k_1}{\beta + k_2}$$

where I represents the interaction type, P represents the page of interaction, M represents the module of interaction, $k_1$ represents the number of new interactions for the interaction triplet or number of known interactions (which would be one for a known interaction and zero for an unknown interaction), $k_2$ represents the total number of new interactions (which would be one since a new interaction was received), and $\alpha$ and $\beta$ represent a current ratio of positive interactions for the interaction. When the interaction is not known, the interaction computation module 412 may simulate the interaction to determine the ratio of positive interactions. In various implementations, similar interactions may be identified and the interaction computation module 412 may select ratios of positive interactions for the similar interactions, determine an average ratio of positive interactions for the similar interactions, etc. The interaction computation module 412 may access a session interaction database 416 to retrieve positive interaction ratios for known or similar interactions as well as identify similar interactions.

The interaction score is forwarded to a confidence filtering module 420 that obtains a confidence threshold from a confidence database 424 and, if the interaction score is above the confidence threshold, forwards the interaction to the session-specific conversion determination module 120 to use the interaction as a feature in the machine learning model. However, if the interaction score is below the confidence threshold, the interaction is not used as a feature. Either way, the interaction, the interaction score, whether the interaction was positive or negative, and other parameters of the interaction are stored in the session interaction database 416 as feedback for the feature determination module 124 to use to determine the interaction score and ratio of positive interactions.

To determine the confidence threshold, a confidence computation module 428 may be run a predetermined intervals, for example, daily, to determine a confidence threshold based on data from the historical database 132. The confidence threshold may, for example, represent a 95% confidence interval that the interaction is represented by enough real-time signals to be used as a feature in the machine learning model of the session-specific conversion determination module 120. The confidence threshold or interval is determined by extracting a top number of features, for example, a top three features, represented in the data of the historical database 132 used for accurately labeling items to calculate, for each feature:

$$\bar{x} \pm \hat{z}\frac{\sigma}{\sqrt{n}}$$

where $\bar{x}$ is the sample mean of the feature, $\hat{z}$ is the z-value (for example, equal to 1.96 got a 95% confidence interval), $\sigma$ is the population standard deviation, and n is the number of samples selected from the historical database 132. The confidence threshold or interval is stored in the confidence database 424.

Figure 5:
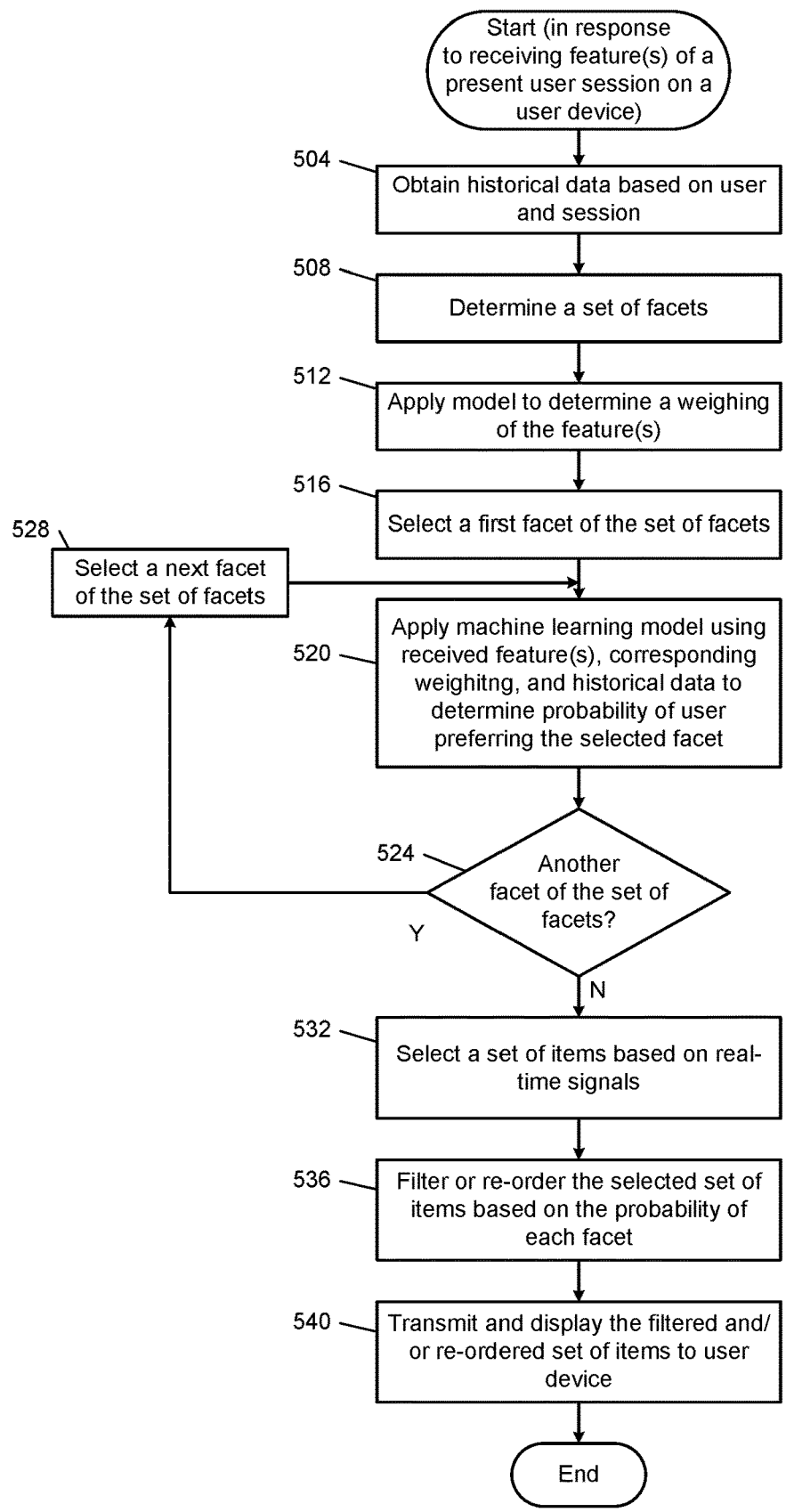
FIG. 5 is a flowchart of example methods of determining probabilities of user preference based on real-time session data in accordance with some embodiments.

Referring to FIG. 5, a flowchart of example methods of determining probabilities of user preference based on real-time session data is shown. Control begins in response to receiving one or more features of a present user session, for example, on an ecommerce platform. Control proceeds to 504 to obtain historical data for the user and the session data. For example, if the user is logged in control can obtain historical data for the user, indicating preferences. Otherwise, if the user is a visitor or guest, control may obtain historical data based on session information relating to the features, such as particular items, views, queries, etc. Control continues to 508 to determine a set of facets, such as brand, flavor, price, etc., which may be stored features of items. Control continues to 512 to apply a model to the received features to determine a weighting of the one or more features. As mentioned previously, the weighting may be determined using a Light Gradient Boost Machine.

Control continues to 516 to select a first facet of the set of facets. Control proceeds to 520 to apply a machine learning model using the received one or more features, the corresponding weighting, and historical data as input to determine a probability the present user prefers the selected facet. Control continues to 524 to determine if another facet of the set of facets exists. If yes, control proceeds to 528 to select a next facet of the set of facets and returns to 520. Otherwise, control proceeds to 532 to select a set of items based on real-time signals of the user navigating the ecommerce platform. In various implementations, the preference probabilities may be forwarded to a separate recommendation system of module to include the preference probabilities when identifying recommended items. Control continues to 536 to filter or re-order the selected set of items based on the probability of each facet. For example, control may select the facet with the highest preference probability and re-order the items based on that facet only. Otherwise, control may weigh the order of the items based on the preference probabilities of each facet. Control continues to 540 to transmit and display the filtered and/or re-ordered set of items to the user device. Then, control ends.

Figure 6:
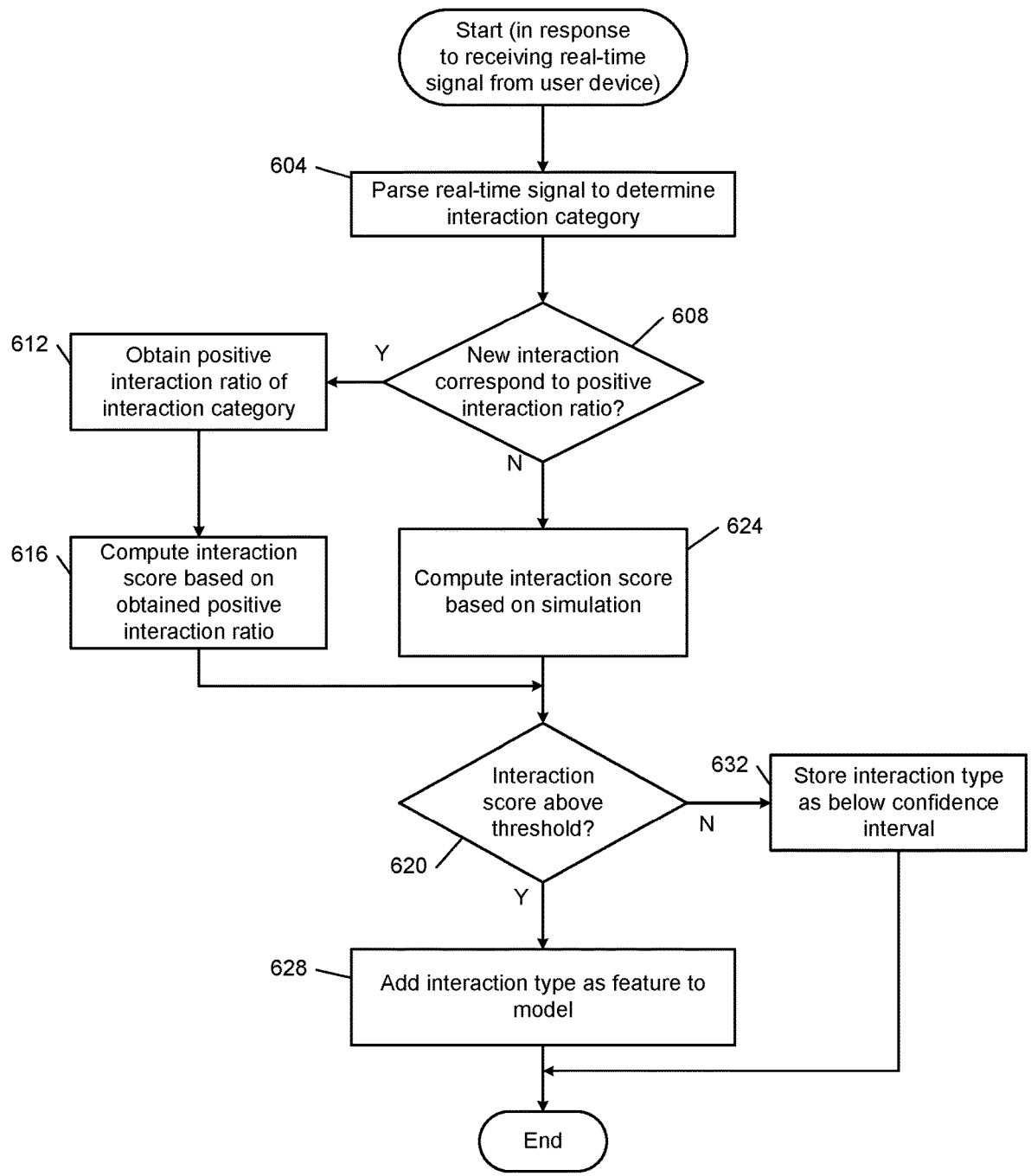
FIG. 6 is a flowchart of examples methods of selecting features to determine probability of user preference in accordance with some embodiments.

Referring to FIG. 6, a flowchart of examples methods of selecting features to determine probability of user preference is shown. Control begins in response to receiving a real-time signal from a user device, for example, corresponding to a user session on an ecommerce platform. Control proceeds to 604 to parse the real-time signal to determine an interaction category based on the interaction type, the interaction page, and the interaction module, as discussed previously. Control continues to 608 to determine whether the new interaction corresponds to a positive interaction ratio stored in a database. If yes, control continues to 612 to obtain a positive interaction ratio of the interaction category stored in a database. Then, control continues to 616 to compute interaction score based on obtained positive interaction ratio. Once computed, control continues to 620 to determine if the interaction score is above a threshold. Otherwise, if at 608 the new interaction does not correspond to a positive interaction ratio, control proceeds to 624.

At 624, control computes the interaction score based on a simulation. As mentioned previously, the interaction score may be determined based on a similar interaction by obtaining the positive interaction ratio for a similar interaction stored in the database. Otherwise, the simulation may generate a positive interaction ratio by randomly simulating the interaction category. Control continues to 620 to determine whether the interaction score is above the threshold. As described previously, the threshold corresponds to a confidence interval calculated according to historical data. If yes, control continues to 628 to add the interaction category as a feature for the model. Otherwise, if the interaction score is below the threshold, control continues to 632 to store the interaction category as below the confidence interval and include the interaction as well as whether the outcome is positive or negative in a database for future inclusion in the model. Then, control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a processor; and
   a non-transitory memory storing instructions, that when executed, cause the processor to:
   receive real-time signals of an event occurring from a user device, the real-time signals including interaction parameters;
   obtain a set of historical data based on the interaction parameters and a set of facets, wherein each facet of the set of facets represents at least one characteristic of at least one item;
   train a machine learning model to generate a probability affinity for a user for at least one predetermined facet in the set of facets and the historical data;
   generate a probability affinity, for each facet of the set of facets by implementing the trained machine learning model using a first probability the user is preferring one facet of the set of facets over other facets in the set of facets based on historical data, and a second probability the user is preferring one facet of the set of facets in the event;
   adjust a display of a set of recommended items based on the probability affinity for each facet of the set of facets; and
   transmit the display of the set of recommended items to a user interface of the user device.

2. The system of claim 1, wherein the instructions cause the processor to:

determine a weighting for each feature of the interaction parameters; and generate the probability affinity based on the determined weighting.

3. The system of claim 2, wherein the weighting is determined by implementing a Light Gradient Boost Machine using the interaction parameters.

4. The system of claim 1, wherein the instructions cause the processor to:

in response to receiving the real-time signals of the event occurring from the user device and prior to obtaining the set of historical data, determine an interaction category based on the interaction parameters;

compute an interaction score based on the interaction category; and in response to the interaction score being above a threshold, designate the interaction parameters as features for the machine learning model wherein the threshold is determined based on historical data.

5. The system of claim 4, wherein the instructions cause the processor to:

in response to the interaction category being known, obtain a positive interaction ratio stored in a database corresponding to the interaction category; and compute the interaction score based on the obtained positive interaction ratio.

6. The system of claim 4, wherein the instructions cause the processor to:

in response to the interaction category being unknown, simulate a set of interactions to determine a positive interaction ratio; and compute the interaction score based on the determined positive interaction ratio.

7. The system of claim 4, wherein the instructions cause the processor to store the interaction score corresponding to the interaction parameters and at least one of a positive and negative interaction indicator for subsequent interaction score computation of the interaction category.

8. The system of claim 1, wherein the instructions cause the processor to transmit the probability affinity for each facet of the set of facets to a recommendation system, the recommendation system being configured to use the probability affinity for each facet of the set of facets as features to identify and transmit the set of recommended items to the user device.

9. The system of claim 1, wherein first probability includes geographical information including interaction parameters for a plurality of users within a distance location of the user device.

10. A method comprising:

receiving real-time signals of an event occurring from a user device, the real-time signals including interaction parameters;

obtaining a set of historical data based on the interaction parameters and a set of facets, wherein each facet of the set of facets represents at least one characteristic of at least one item;

training a machine learning model to generate a probability affinity for a user for at least one predetermined facet in the set of facets and the historical data;

generating a probability affinity, for each facet of the set of facets by implementing the trained machine learning model using a first probability the user is preferring one facet of the set of facets over other facets in the set of facets based on historical data, and a second probability the user is preferring one facet of the set of facets in the event;

adjusting a display of a set of recommended items based on the probability affinity for each facet of the set of facets; and transmitting the display of the set of recommended items to a user interface of the user device.

11. The method of claim 10, further comprising:

determining a weighting for each feature of the interaction parameters; and generating the probability affinity based on the determined weighting.

12. The method of claim 11, wherein the weighting is determined by implementing a Light Gradient Boost Machine using the interaction parameters.

13. The method of claim 10, further comprising:

in response to receiving the real-time signals of the event occurring from the user device and prior to obtaining the set of historical data, determining an interaction category based on the interaction parameters;

computing an interaction score based on the interaction category; and in response to the interaction score being above a threshold, designating the interaction parameters as features for the machine learning model wherein the threshold is determined based on historical data.

14. The method of claim 13, further comprising:

in response to the interaction category being known, obtaining a positive interaction ratio stored in a database corresponding to the interaction category; and computing the interaction score based on the obtained positive interaction ratio.

15. The method of claim 13, further comprising:

in response to the interaction category being unknown, simulate a set of interactions to determine a positive interaction ratio; and compute the interaction score based on the determined positive interaction ratio.

16. The method of claim 13, further comprising storing the interaction score corresponding to the interaction parameters and at least one of a positive and negative interaction indicator for subsequent interaction score computation of the interaction category.

17. The method of claim 13, further comprising transmitting the probability affinity for each facet of the set of facets to a recommendation system, the recommendation system using the probability affinity for each facet of the set of facets as features to identify and transmitting the set of recommended items to the user device.

18. A non-transitory computer readable medium having instructions stored thereon, wherein the instructions, when executed by at least one processor, cause a device to perform operations comprising:

receiving real-time signals of an event occurring from a user device, the real-time signals including interaction parameters;

obtaining a set of historical data based on the interaction parameters and a set of facets, wherein each facet of the set of facets represents at least one characteristic of at least one item;

training a machine learning model to generate a probability affinity for a user for at least one predetermined facet in the set of facets and the historical data;

generating a probability affinity, for each facet of the set of facets by implementing the trained machine learning model using a first probability the user is preferring one facet of the set of facets over other facets in the set of facets based on historical data, and a second probability the user is preferring one facet of the set of facets in the event;

adjusting a display of a set of recommended items based on the probability affinity for each facet of the set of facets; and transmitting the display of the set of recommended items to a user interface of the user device.

19. The non-transitory computer-readable medium of claim 18, further comprising:

determining a weighting for each feature of the interaction parameters; and generating the probability affinity based on the determined weighting.

20. The method of claim 10, wherein first probability includes geographical information including interaction parameters for a plurality of users within a distance location of the user device.

* * * * *